Patented Oct. 28, 1941

2,261,042

UNITED STATES PATENT OFFICE 2,261,042

VULCANIZATION OF RUBBER

Ira Williams, Woodstown, N. J., assignor to E. I. Du Pont de Nemours & Company, Wilmington, Del., a corporation of Delaware No Drawing. Application November 18, 1938, Serial No. 241,139

18 Claims. (Cl. 260—788)

This invention relates to the vulcanization of rubber and more particularly to a new class of substances which are accelerators of vulcanization.

The vulcanization of rubber is old in the art and many classes of substances have been employed as vulcanization accelerators. Among the more common materials which have been employed are salts and esters of disubstituted dithio-carbamic acids, substituted guanidines, substituted thioureas, aldehyde amine condensation products and mercapto-arylene-thiazoles. Each of these classes of accelerators produce slightly different results and each has found application under conditions to which it is best suited.

It is an object of the present invention to provide a new class of accelerators for the vulcanization of rubber. A further object is to provide a new class of accelerators, the use of which will avoid premature vulcanization during the processing of the rubber and which accelerators are of utility under new and different conditions. A still further object is to provide a method for vulcanizing rubber. Still other objects are to produce new compositions of matter and to advance the art.

The above objects may be accomplished by adding to a rubber mix, prior to vulcanization, a small amount of a 2-amino-thiazoline compound. By a 2-amino-thiazoline compound, I wish to include 2-amino-thiazoline which has the formula

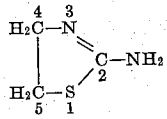

derivatives thereof in which one or more of the hydrogens are replaced by one or more alkyl or aryl groups and weak acid salts of such thiazolines. I have found that these amino-thiazolines are, as a class, very effective accelerators for the vulcanization of rubber, having many of the vulcanization characteristics of the mercapto-arylene-thiazoles, but having the advantage that they are substantially inactive at a temperature of 227° F. and below.

The preferred class of amino-thiazolines of my invention are those represented by the formula

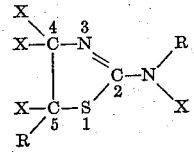

in which "X" represents hydrogen or an alkyl radical and "R" represents hydrogen or an alkyl or aryl radical. When the compounds contain aryl radicals, such aryl radicals may contain halogen, hydroxyl or amino substituents, but are preferably unsubstituted. The term "aryl" as hereinafter employed will be understood to include radicals containing such substituents unless otherwise limited. The "aryl" radicals will include radicals of the benzene, naphthalene, phenanthrene, diphenyl and like series, but will preferably be of the benzene or naphthalene series. Preferably the alkyl radicals will be the lower alkyl radicals, that is, those containing from 1 to 6 carbon atoms, but may be long-chain alkyl radicals. While the thiazolines of my invention may contain aryl groups, the most effective compounds appear to be those in which the substituents, when present, consist of alkyl radicals.

The 2-amino-thiazolines of my invention are basic compounds which readily form salts with acids. Their salts with strong acids have not proved to be satisfactory as accelerators. However, salts formed from weak acids, that is, acids not stronger than formic acid ($K_a \times 10^4$=about 2), are satisfactory accelerators.

In order to illustrate my invention more clearly, the preferred modes of carrying the same into effect and the advantageous results to be obtained thereby, the following examples are given:

Example 1

A mixture of 100 parts of rubber, 5 parts of zinc oxide, 25 parts of carbon black, 3 parts of sulfur and 3 parts of stearic acid was prepared and portions were treated with 1 part of various 2-amino-thiazolines. The compounds were then cured at 287° F. and tested with the following results:

| Thiazoline | Load at 500% elongation | | Tensile strength | |
|---|---|---|---|---|
| | 20 min. | 60 min. | 20 min. | 60 min. |
| 2-phenylamino-thiazoline | 975 | 2050 | 2050 | 3600 |
| 2-methylamino-thiazoline | 1450 | 2750 | 3250 | 3850 |
| 2-amino-5-methyl-thiazoline | 1075 | 2175 | 2375 | 3675 |
| 2-amino-5:5-dimethyl-thiazoline | 1000 | 2125 | 2350 | 3650 |
| 2-ethylamino-5-methyl-thiazoline | 1125 | 2375 | 2525 | 4100 |
| 2-butylamino-5-methyl-thiazoline | 900 | 2250 | 2225 | 4100 |
| 2-diethylamino-5-methyl-thiazoline | 750 | 1700 | 1650 | 2875 |

None of the above compounds vulcanized in 30 minutes at 227° F.

*Example 2*

The rubber mixture used in Example 1 was treated with one part of various salts of 2-amino-5-methyl-thiazoline and the vulcanization characteristics of the compound were determined.

| Accelerator | Vulcanization characteristics |
| --- | --- |
| Diethyl-dithio carbamic acid salt | A very active accelerator at 227° F. |
| 2-mercapto-benzothiazole salt | Active at 260° F. |
| Acetate | Moderately active at 287° F. |
| Hydrochloride | No practical value. |

Other compounds falling within my invention and which I have found to be accelerators for the vulcanization of rubber are the following:

2-(para-chlor-phenylamino)-thiazoline
2-(para-hydroxy-phenylamino)-thiazoline
2-(para-fluoro-phenylamino)-thiazoline
2-methylamino-5-methyl thiazoline
2-butylamino-5-ethyl thiazoline
2-octylamino-5-methyl thiazoline
Para-phenylene-di-(2-amino-5-methyl thiazoline)
Di-ethyl-dithio-carbamic acid salt of 2-butyl-amino-5-methyl-thiazoline
2-amino-4:5-di-methyl-thiazoline
2-methylamino-5-phenyl-thiazoline While the examples illustrate the use of these products under one set of conditions, they are valuable under a wide variety of conditions. The rubber composition may be altered to contain any of the compounding ingredients available for use in rubber and the amount of sulfur may be varied to produce the desired results. The amount of the amino-thiazoline may also be varied considerably but the amount to be preferred lies between about 0.1% and about 5% of the weight of the rubber. The temperature of vulcanization may also be altered to suit the particular conditions.

The amino thiazolines constitute a class of accelerators which produce no discoloration in the rubber and which are particularly free from activity at processing temperatures. In contrast to the thioureas, dithio-carbamates and mercapto-arylene thiazoles, they may be used in the presence of basic substances such as the guanidines without causing premature vulcanization.

Also, my compounds may be employed with other accelerators such as the acidic type sulfur-containing accelerators to activate the same in the same manner as and in place of the guanidines.

While I have disclosed the preferred embodiments of my invention and the preferred modes of carrying the same into effect, it will be readily apparent to those skilled in the art that many variations and modifications can be made in the compounds employed and in the conditions under which they are employed without departing from the spirit of my invention. Accordingly the scope of my invention is to be limited solely by the appended claims construed as broadly as is permissible in view of the prior art.

I claim:

1. The method of vulcanizing rubber which comprises incorporating into the rubber mix, prior to vulcanization, a small amount of a 2-amino-thiazoline compound of the group consisting of 2-amino-thiazolines and their salts of weak acids.

2. The method of vulcanizing rubber which comprises incorporating into the rubber mix, prior to vulcanization, a small amount of a 2-amino-thiazoline which, except for the nitrogen of the amino group and the nitrogen and sulfur of the thiazoline ring, consists of carbon and hydrogen and is free of aromatic rings.

3. The method of vulcanizing rubber which comprises incorporating into the rubber mix, prior to vulcanization, a small amount of a weak acid salt of a 2-amino-thiazoline which, except for the nitrogen of the amino group and the nitrogen and sulfur of the thiazoline ring, consists of carbon and hydrogen and is free of aromatic rings.

4. Rubber having incorporated therein, as a vulcanization accelerator, a small amount of a 2-amino-thiazoline compound of the group consisting of 2-amino-thiazolines and their salts of weak acids.

5. Rubber having incorporated therein, as a vulcanization accelerator, a small amount of a 2-amino-thiazoline.

6. Rubber having incorporated therein, as a vulcanization accelerator, a small amount of a 2-amino-thiazoline which, except for the nitrogen of the amino group and the nitrogen and sulfur of the thiazoline ring, consists of carbon and hydrogen.

7. Rubber having incorporated therein, as a vulcanization accelerator, a small amount of a weak acid salt of a 2-amino-thiozoline.

8. Rubber having incorporated therein, as a vulcanization accelerator, a small amount of a weak acid salt of a 2-amino-thiazoline which, except for the nitrogen of the amino group and the nitrogen and sulfur of the thiazoline ring, consists of carbon and hydrogen.

9. Rubber having incorporated therein, as a vulcanization accelerator, a small amount of 2-amino-thiazoline containing at least one alkyl substituent but no other substituents.

10. Rubber having incorporated therein, as a vulcanization accelerator, a small amount of 2-amino-thiazoline containing at least one alkyl substituent on the thiazoline ring and being otherwise free of substituents.

11. Rubber having incorporated therein, as a vulcanization accelerator, a small amount of 2-amino-thiazoline containing at least one methyl substituent on the thiazoline ring and being otherwise free of substituents.

12. Rubber having incorporated therein, as a vulcanization accelerator, a small amount of 2-amino-5-alkyl-thiazoline.

13. Rubber having incorporated therein, as a vulcanization accelerator, a small amount of 2-amino-5-methyl-thiazoline.

14. Rubber having incorporated therein, as a vulcanization accelerator, a small amount of 2-amino-5:5-dimethyl thiazoline.

15. Rubber having incorporated therein, as a vulcanization accelerator, a small amount of a weak acid salt of 2-amino-thiazoline containing at least one alkyl substituent on the thiazoline ring and being otherwise free of substituents.

16. Rubber having incorporated therein, as a vulcanization accelerator, a small amount of a weak acid salt of 2-amino-5-alkyl-thiazoline.

17. Rubber having incorporated therein, as a vulcanization accelerator, a small amount of a weak acid salt of 2-amino-5-methyl thiazoline.

18. Rubber having incorporated therein, as a vulcanization accelerator, a small amount of the 2-mercapto-benzothiazole salt of 2-amino-5-methyl-thiazoline.

IRA WILLIAMS.